United States Patent [19]
Huck

[11] 3,880,272
[45] Apr. 29, 1975

[54] TRANSFER CONVEYOR

[75] Inventor: William F. Huck, Franklin Lakes, N.J.

[73] Assignee: Bangor Punta Operations, Inc., Greenwich, Conn.

[22] Filed: July 2, 1973

[21] Appl. No.: 375,411

Related U.S. Application Data

[63] Continuation of Ser. No. 172,336, Aug. 12, 1971, abandoned.

[52] U.S. Cl............. 198/20 R; 214/1 BT; 271/194
[51] Int. Cl............................................. B65g 47/00
[58] Field of Search............... 198/20 R; 214/1 BT; 271/139, 140, 174, 194, 99

[56] References Cited
UNITED STATES PATENTS 2,862,709  12/1958  Labombarde.................... 271/99
3,531,016  9/1970   Pray............................. 198/20 R Primary Examiner—Evon C. Blunk
Assistant Examiner—Douglas D. Watts
Attorney, Agent, or Firm—Patrick J. Walsh

[57] ABSTRACT

A transfer conveyor is disclosed for feeding work pieces such as lithographed tin-plated steel sheets into a drying oven which dries the lithographed sheets. The conveyor includes conveying means cooperating with positioning means to feed the sheets in timed relation to movement of an oven conveyor which receives the tin-plated sheets for drying within the oven.

5 Claims, 6 Drawing Figures

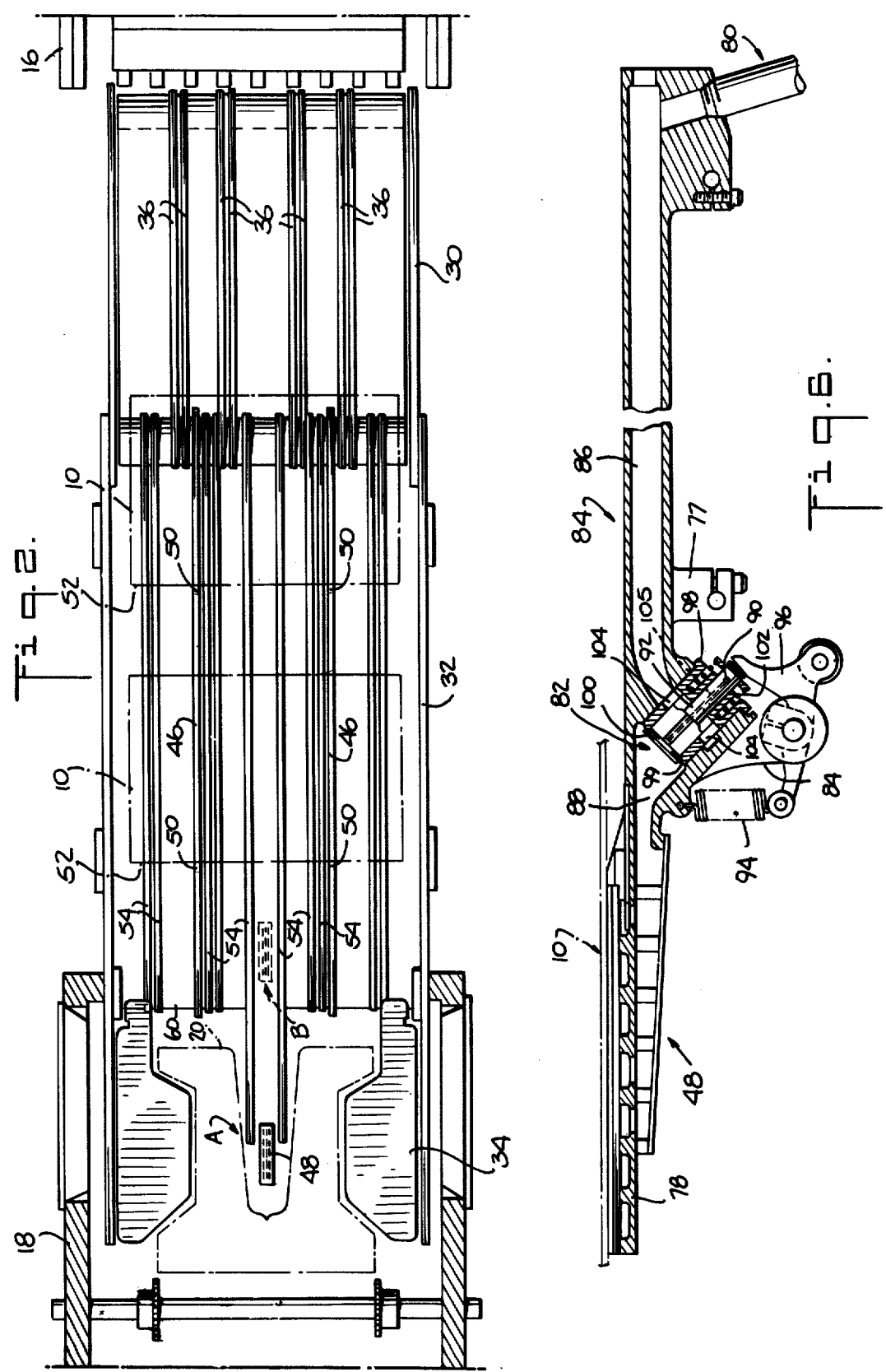

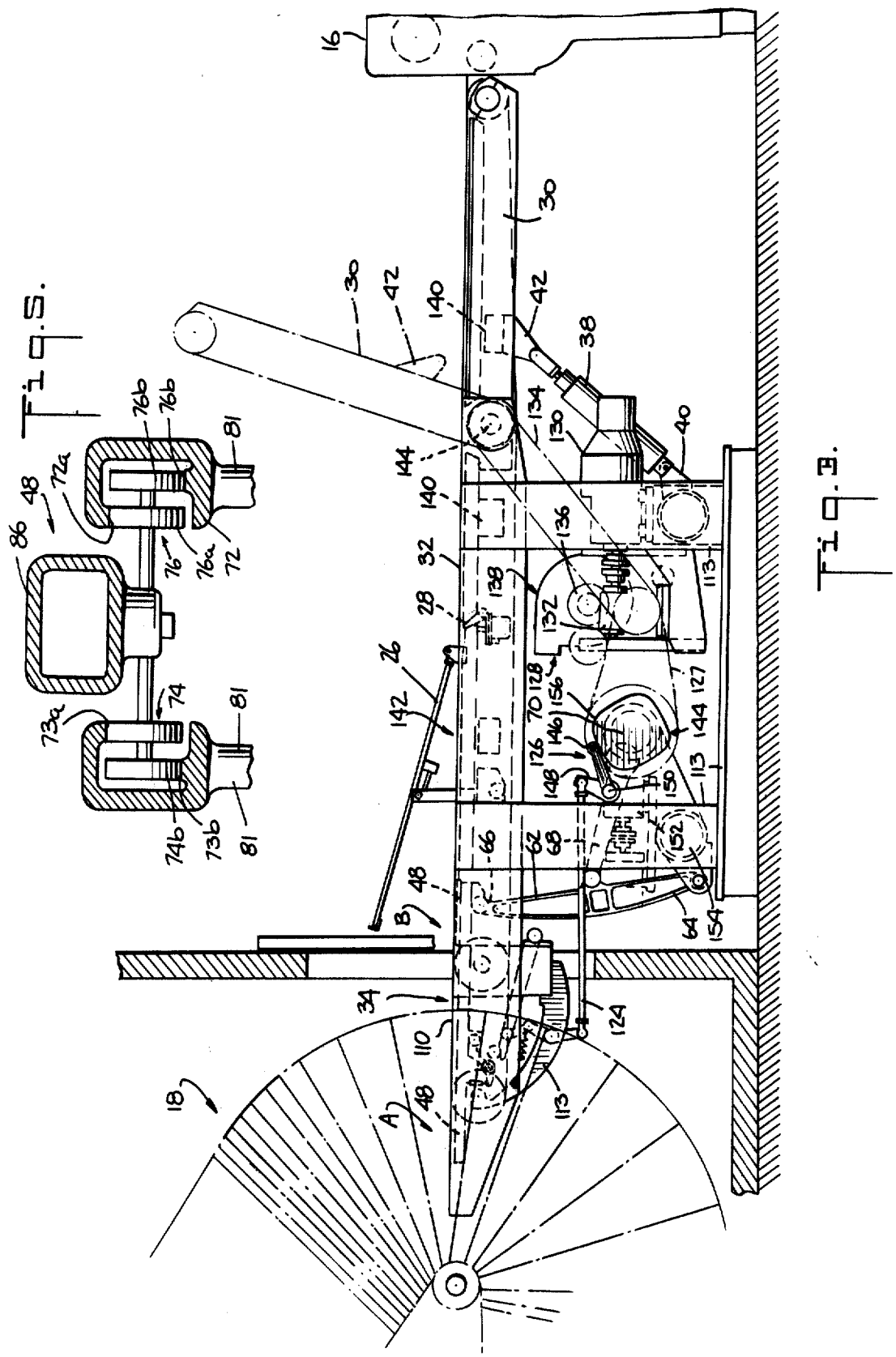

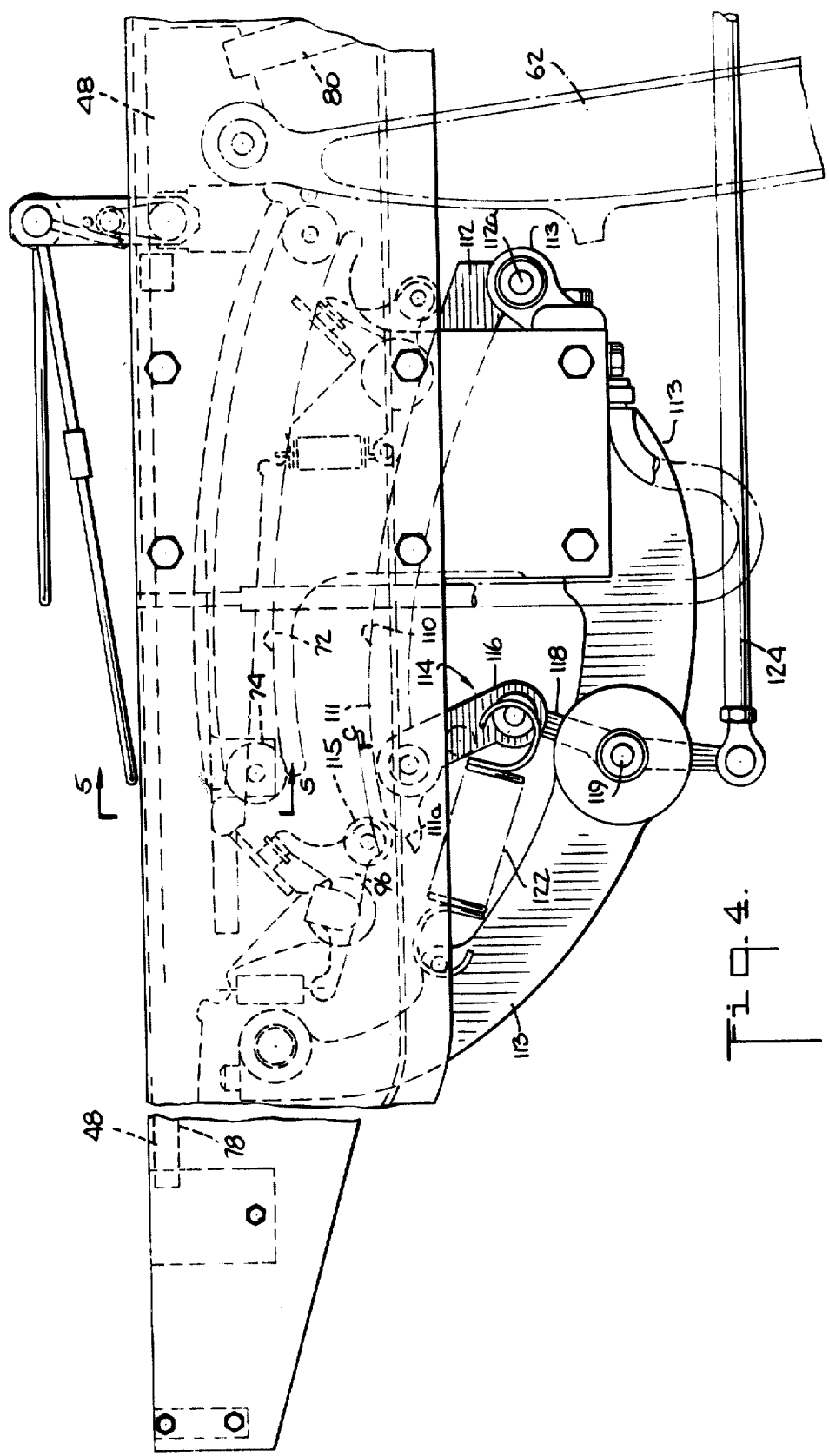

3,880,272

TRANSFER CONVEYOR

This application is a continuation of application Ser. No. 172,336 filed Aug. 12, 1971 now abandoned.

BACKGROUND OF THE INVENTION

In the manufacture of metal articles such as tin cans, particularly those commonly used for packaging beverages, a sheet of tin-plated steel is decorated and coated with lacquer prior to fabrication into can bodies. Immediately after the lacquer coating operation, the tin-plated sheet is introduced into a drying oven so that lacquer solvents may be removed and the coating dried prior to fabricating can bodies from the coated tin-plated steel sheet.

In present manufacturing techniques the tin-plated sheets travel at approximately 600 feet per minute representing approximately 150 sheets per minute, spaced approximately 12 inches apart through a coating machine. In this manufacturing operation, it is necessary to transfer the coated sheets from the coating machine into the drying oven; i.e., it is necessary to bring the sheets to a stop and to transfer the sheets to a wicket oven at approximately 150 sheets per minute. This transfer of sheets is accomplished by means of a conveyor table.

United States Letters Pat. No. 3,523,603 to Philips et al., discloses a conveyor table in which lithographed sheets are placed onto oven or wicket conveyors for drying. In Philips et al. the individual sheets are under positive control until released precisely in position to be picked up by the wicket conveyor to avoid edge damage and excessive frictional drag and to achieve proper positioning of the sheets with respect to the wicket conveyor. A reciprocating vacuum head grips and moves each sheet into position adjacent the wicket (oven) conveyor. The present invention discloses certain improvements in respect of conveyors of the kind disclosed by Philips et al.

SUMMARY OF THE PRESENT INVENTION

The present invention provides a transfer conveyor for feeding coated sheets from a coating machine to a drying oven.

According to the present invention, sheets are moved by a transfer conveyor in timed relation to the movement of oven wickets through a transfer station. The transfer conveyor of the present invention delivers a coated sheet to each oven wicket passing through a transfer station at a rate of approximately 150 sheets per minute. The timing is accomplished by delivering each metal sheet to a timing conveyor moving in timed relation to the oven wickets. The leading edge of each sheet registers with means on the timing conveyor to assure proper delivery. A delivery conveyor moves at a speed in excess of the line speed of the timing conveyor to deliver each sheet to the timing means.

The present invention relates more particularly to a transfer head cooperating with the timing conveyor for stopping each sheet at the transfer station in position to be carried into the oven by one of the wickets comprising the oven wicket conveyor.

The transfer head comprises a reciprocating housing including a vacuum shoe which reciprocates in timed relation to the timing conveyor and each coated sheet on the timing conveyor so that the transfer head by means of its vacuum shoe will engage and take control of each coated sheet. The vacuum head comes to the end of its forward travel at the transfer station where the coated sheet is brought to a stop and released by the transfer head for pickup by the oven wicket conveyor.

Preferably, the transfer conveyor is provided at longitudinally spaced intervals with vacuum means for maintaining each sheet in close proximity to the conveyor surface.

DESCRIPTION OF THE DRAWINGS

A preferred embodiment of the present invention has been chosen for illustrating the principals of the present invention and is shown in the accompanying drawings forming a part of the specification wherein:

FIG. 2 is a plan view of the transfer conveyor shown in position between a coating machine at the right in FIG. 2 and a drying oven shown to the left in FIG. 2, FIG. 3 is a side elevation view shown partially in section corresponding to FIG. 2, FIG. 4 is a side elevation view of the transfer head of the transfer conveyor according to the present invention, FIG. 5 is a view taken along line 5—5 of FIG. 4, and FIG. 6 is a side elevation in section of the reciprocating transfer head according to the present invention.

DETAILED DESCRIPTION OF THE INVENTION

Figure 1:
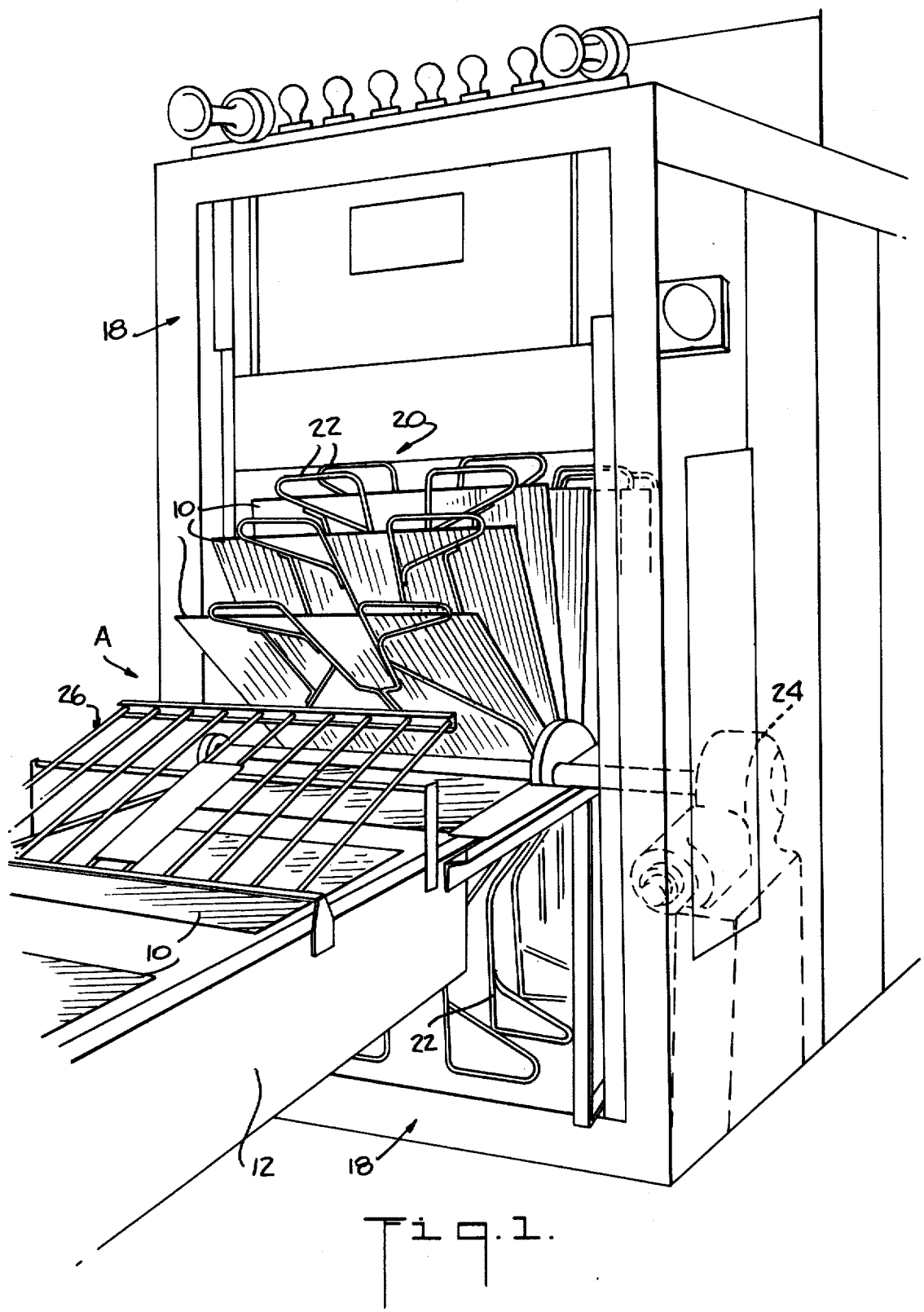
FIG. 1 is a perspective view illustrating the entrance to a drying oven where tin-plated sheets are delivered by the transfer conveyor to the oven wicket conveyor.

Referring now to the drawings, and particularly to FIGS. 1, 2, and 3, coated sheets 10 are moved by a transfer conveyor 12 from a coating machine 16 to a drying oven 18 where the lacquer coating of the sheets is dried. The coated sheets are moved individually in a line by the transfer conveyor to a transfer station A adjacent the oven. The oven is equipped internally with a wicket conveyor 20 comprising a series of wickets 22 for receiving the individual tin-plated sheets for carrying the sheets in a generally vertical orientation through the drying oven in a manner as to not to disturb the coating on the sheets. A suitable drive unit 24 moves the wicket conveyor in timed relation to the arrival of individual sheets at the transfer station A so that each wicket receives and removes one sheet at the transfer station. If desired, the transfer conveyor may be equipped with an inspection stand 26 for removing specimen sheets from the production line for quality control purposes. A suitable diverting mechanism 28 (FIG. 3) may be employed for this purpose.

Referring now to FIGS. 2 and 3, the transfer conveyor includes an entrance section 30, a timing section 32 and a transfer section 34. At the entrance section a plurality of conveying belts 36 are moved at a speed in excess of line speed from the coating equipment to the timing section of the transfer conveyor. Preferably, the entrance conveyor belts move at a speed equal to line speec plus about 10 percent for timing purposes by means of a suitable drive mechanism illustrated in FIG. 3 including a timing belt and a suitable drive shaft over which the entrance conveyor belts are trained. If desired, the entrance section of the transfer conveyor may be pivoted to an elevated position as desired to provide access to the coating equipment. For this purpose, a suitable cylinder 38 cooperating with spaced brackets 40, 42 may be used to pivot the entrance section of the conveyor to its elevated position about the drive shaft axis 44.

The timing section 32 of the conveyor includes a plurality of timing belts 46 which move in timed relation to the oven wicket conveyor 20 and a transfer head 48 so that individual sheets may be transferred in a timely manner to the wicket at the transfer station A. The timing conveyor belts 46 are provided with upstanding lugs 50 which provide the timing mechanism feature of the timing section of the conveyor; i.e., the lugs locate the leading edge 52 of each coated sheet 10 for purposes of delivering the coated sheet in a timely manner to the transfer head 48 for transfer to the oven wicket conveyor 20. The timing section of the conveyor is also provided with a plurality of feed belts 54 like the belts 36 at the entrance section which move at line speed plus approximately ten percent for the purpose of delivering individual sheets into contact with the time reference lugs 50 of the timing belts 46. In this manner timing is accomplished without regard to the size of individual coated sheets. To provide for different speed of the feeding belts with respect to the timing belts the feeding belts 54 may be trained over the smaller diameter section of drive shafts 58 and 60 and the timing belts trained over the larger diameter portion of the drive shafts 58 and 60.

Near the terminal portion of the timing conveyor each sheet 10 is engaged by a transfer head 48 moving at approximately line speed which transfer head takes control of each individual sheet to move the sheet to the transfer station A and to stop the forward movement of the sheet in time for pickup by the wicket conveyor 20.

As shown in FIGS. 2, 3, and 4 the transfer head 48 reciprocates in simple harmonic motion between the point of pickup B at the transfer conveyor and the point of delivery at the transfer station A. This simple harmonic motion is accomplished by means of a reciprocating arm 62 pivoted at its lower end 64 to the machine frame and at its upper end 66 to the transfer head 48. A suitable drive link 68 connected to a drive shaft 70 provides for reciprocating movement of the reciprocating arm. The reciprocating arm 62 also supports the rear portion of the transfer head 48.

The transfer head 48 is also supported by a pair of confronting guide surfaces 72, 73 (FIG. 5) which are preferably curved and mounted on suitable supports 79 and 81. The guide surfaces receive guide roller sets 74, 76 (fitted into boss 77) which effectively control the path of travel of the transfer head; i.e., the transfer head moves upwardly and then slightly downwardly following the contour of the guide surfaces 72, 73 as the transfer head moves between the pickup point and transfer station. Preferably, each guide roller set 74 and 76 (FIG. 5) includes adjacent rollers 74a, 74b; 76a, 76b offset slightly with respect to each other. Inner rollers 74a and 76a cooperate with recessed upper guide surfaces 73a and 72a respectively. Similarly, outer rollers 74b and 76b cooperate with the recessed lower guide surfaces 73b and 72b respectively. This arrangement allows the desired guide roller action for the transfer head 48.

By this arrangement the transfer head is effective to engage each sheet, lift the sheet slightly with respect to the transfer conveyor for delivery to the corresponding wicket and then to drop below the surface of the sheet at the transfer station thereby to become disengaged from the coated surface and to be free to return to the pickup point in timed relation to the arrival of the next succeeding coated sheet. The transfer head 48 (FIG. 6) is provided with a vacuum shoe 78 connected to a suitable vacuum source 80 which draws air through the vacuum shoe to provide suction control between the transfer head and each sheet. The application of vacuum to the vacuum shoe is controlled by a valve 82 located in the transfer head. The valve 82 is effective to provide a vacuum hold between the vacuum shoe 78 and each sheet 10 during travel of the transfer head 48 toward the transfer station A and to release the vacuum hold just prior to arrival of each sheet at the transfer station.

For this purpose the transfer head 48 as shown in FIG. 6 comprises an elongated body member 84 which terminates at one end in the vacuum shoe 78 for engaging consecutive sheets during the transfer operation. The vacuum source 80 communicates with the vacuum shoe through adjacent channels 86, 88 which are connected to each other by the vacuum valve 82. The vacuum source 80 is connected to a suitable vacuum pump referred to below. By opening the vacuum valve, the vacuum shoe 78 is connected to the vacuum source 80. When the valve 82 is closed, an exhaust port 90 in the vacuum valve stem 92 breaks the vacuum at the vacuum shoe.

The valve 82 is actuated by a spring loaded cam actuated tappet 96 which is pivotally mounted to the transfer head body 84. By this arrangement the tappet 96 is pivoted away from the vacuum valve 82 so that the valve can be kept in a normally closed condition. The valve itself is inserted into the transfer head housing and includes a valve body 98 having a suitable seat 99 engaged by the valve disc 100 for closing the valve. The valve stem is spring loaded at 102 to normally rest against its seat in a closed position. The valve body 98 has suitable openings 104 to provide for fluid flow between the vacuum channels 86 and 88 through the valve body. The strategically located port 90 is effective to break the vacuum under the vacuum shoe when the valve sea is in the closed position. The vacuum is broken as ambient air enters the port flows through a central bore 105 in the valve stem to the channel 83. This arrangement is desirable to break the vacuum hold of the vacuum shoe on a coated sheet being held at the transfer station on the vacuum shoe. When the valve is opened as to draw vacuum, the exhaust port is covered by the valve body and vacuum is not lost through the port 90.

The vacuum valve 82 (FIG. 4) for controlling vacuum is actuated by a curved cam member 110 pivotally mounted at one end 112 to the machine frame 113 and connected at its other end to a lifting linkage 114. The curved cam member is lifted and lowered in timed relation to the movement of the transfer head 48 and more particularly to the movement of the cam follower 115 on the valve tappet 96 thereby to provide for timing of suction at the vacuum shoe in relation to the overall transfer operation. The cam member has a curved surface 111 throughout its length and terminates in a recess 111a. The purpose of recess 111a is described below. The cam actuating linkage 114 includes articulated links 116, 118 connected to each other at a pivot point 120 and spring loaded at 122 to the machine frame 113 to maintain a "normally up" position. The link 118 is pivotally mounted at 119 to the machine frame 113. The cam actuating linkage 114 is actuated by a reciprocating bar 124 which is moved by a timing drive 126 (FIG. 3) in a manner more fully described below.

The cam member 111 moves in a generally vertical direction about pivot point 112a (FIG. 4) as indicated by the arrow C. The spring 122 maintains the cam member in a normally up position. As the bar 124 reciprocates, the spring bias is overcome and the bar 124 acting through linkage 114 lowers the cam surface. This action occurs in timed relation to the transfer head movement so that valve 82 (controlled by tappet 96) will actuate as necessary to establish and break the vacuum hold of the transfer head on each coated sheet.

Referring now to FIG. 3 the transfer conveyor is provided with a main drive unit 128 including a main motor 130, speed reducer 132, power take-offs 134 for driving the conveyor belts. An air blower 138 maintains a slight vacuum within a vacuum reservoir 140 for evacuating the vacuum boxes 142 used with the conveyor to maintain the sheets in close proximity to the conveyor surface. The main drive unit also drives the reciprocating arm 62 and the reciprocating valve linkage bar 124 by means of the timing drive unit 126 though take-off 127. The reciprocating arm 62 is connected by the direct link 68 to a timing drive shaft 70 for suitable reciprocating (simple harmonic) movement. The reciprocating bar for driving the valve linkage is actuated by a cam 144 located on the timing drive shaft 70 which cooperates with a cam follower 146 mounted on a bell crank 148 which is pivoted to the machine frame at 150.

In this manner the movement of the conveyor belts, the transfer head, and the vacuum valve are synchronized to provide for timely movement of each sheet to the pickup station B, vacuum gripping of the sheet by the transfer head and release of the vacuum grip. In addition, the main motor 130 may be synchronized with the oven drive motor to synchronize the oven conveyor movement.

A vacuum pump 152 and a vacuum reservoir 154 are provided so that adequate vacuum may be applied to the vacuum shoe through suitable pipe work 80.

In operation at the beginning at the forward stroke the transfer head 48 is located in its rear most (upstream) position having an elevation slightly below the bottom surface or feed line of other sheets moving along the conveyor. As the head moves forward it moves upwardly following the guide surfaces to meet the lower surface of the coated sheet. This forward and upward movement occurs during approximately ½ of the forward stroke. At the time the vacuum shoe 78 contacts the sheet, the forward motion of the transfer head is at the forward speed of the coated sheet moving on the conveyor. As the forward stroke continues, the transfer head raises the sheet slightly above the top of the conveyor surface. This slight elevation above the conveyor surface is maintained to the end of the forward travel of the transfer head. On the return stroke, the transfer head retraces its forward movement. The transfer head on the return stroke has retreated to an elevation slightly below the feed line before arrival of the next following sheet.

During forward travel of the transfer head, the vacuum valve 82 is controlled by the tappet 96 mechanism which rides on its corresponding contoured cam 110. At the beginning of the forward travel of the transfer head, the contour cam 110 is moved to its upper position by the cam linkage 114 which in turn is controlled by the cam lobe 156 on the main timing shaft 70. When the transfer head has traveled approximately ¼ of its forward travel, the normally closed vacuum valve begins to open and the opening of the vacuum valve is completed about ½ through the forward stroke of the transfer head. At this time the vacuum shoe contacts and secures a vacuum hold on the coated sheet. When the transfer head has reached the end of its forward stroke, the cam roller 115 drops to the recess 111a on the contoured cam 110 and at the same time the reciprocating cam linkage 114 moves the contour cam to its lower position. At this time the vacuum valve 82 closes and the vacuum is released through the bore 92 in the center of the vacuum valve stem through its strategically located port 90. The vacuum valve remains closed during the entire return stroke. During the return stroke, the cam roller 115 clears the top surface of the contour cam until near the end of the stroke when the cam roller engages the contour cam. However, a slight clearance between the tappet and the valve stem is provided so that the vacuum valve will be pushed closed by the spring 102.

It will be apparent that the present invention provides an improved transfer conveyor for articles such as coated tin-plated steel sheets between a coating mechanism and a drying oven and it is to be understood that the present invention may have other applications.

Various changes may be made in the form, construction, and arrangement of the parts described herein without departing from the spirit and scope of the invention and without sacrificing any of its advantages and it is to be understood that the foregoing disclosure is to be interpreted in an illustrative and not in a limiting sense.

What is claimed is:

1. A mechanism for transferring sheets from a sheet conveyor to a delivery station comprising transfer head, means for moving the transfer head between a starting point and the delivery station along a curved path, curved guide means for supporting the guiding and transfer head during movement between the starting point and the delivery station, said moving means being adapted to move the transfer head at the approximate speed of sheets moving along the conveyor as the transfer head is in motion between the starting point and the delivery station, said guide means for guiding the transfer head through an initial upwardly curved movement to a pick-up station followed by a downwardly curved movement as the head moves from the pick-up station to the delivery station, said transfer head being adapted to engage sheets at the point of pick-up and to deliver the sheets to the delivery station, said transfer head being further adapted to maintain suction hold on the sheets between the point of pick-up and the delivery station, means for connecting the transfer head to a vacuum source for selectively interrupting the vacuum applied to the transfer head, means for releasing the vacuum hold on the transfer head at the delivery station.

2. A mechanism for transferring sheets from a sheet conveyor to a delivery station comprising transfer head, means for moving the transfer head between a starting point and the delivery station along a curved path, curved guide means for supporting the guiding and transfer head during movement between the starting point and the delivery station, said moving means being adapted to move the transfer head at the approximate speed of sheets moving along the conveyor as the transfer head is in motion between starting point and the delivery station, said guide means for guiding the transfer head through an initial upwardly curved movement to a pick-up station followed by a downwardly curved movement as the head moves from the pick-up station to the delivery station, said transfer head being adapted to engage sheets at the point of pick-up and to deliver the sheets to the delivery station, means for connecting the transfer head to a vacuum source including a valve member for selectively interrupting the vacuum applied by the transfer head, said valve having means for releasing the vacuum hold of the transfer head on a sheet when the valve is in a closed position, said valve further adapted to communicate the vacuum source when in an open position, means for urging the valve into a normally closed position, a tappet for actuating said valve between open and closed positions, said tappet being biased so that the valve retains its normally closed position, and a curved cam member for actuating the tappet in timed relation to movement of the transfer head to establish a vacuum hold of the transfer head on a sheet at the pick-up station and to break the vacuum hold at the transfer station.

3. The transfer head as defined in claim 2 in which the curved cam member is pivotally mounted for lift and lowering in timed relation to movement of the transfer head to provide for timing of the vacuum hold and the breaking of the vacuum hold in relation to the transfer operation.

4. The transfer head as defined in claim 2 in which the curved cam member has a recess at its terminal end for releasing engagement of the tappet to the valve thereby to break the vacuum.

5. The transfer head as defined in claim 2 in which the valve begins to open when the transfer head has completed approximately one fourth of its forward travel and in which the valve closes as the transfer head arrives at the end of its forward stroke.

* * * * *